United States Patent [19]

Moran et al.

[11] 4,141,664
[45] Feb. 27, 1979

[54] ROTARY BLADE RETENTION SYSTEM

[75] Inventors: Michael W. Moran, McKean Township, Erie County; Lawrence A. Bergman, Erie, both of Pa.

[73] Assignee: Lord Corporation, Erie, Pa.

[21] Appl. No.: 802,843

[22] Filed: Jun. 2, 1977

Related U.S. Application Data

[63] Continuation of Ser. No. 597,105, Jul. 18, 1975, abandoned.

[51] Int. Cl.[2] ............................................. F16D 3/00
[52] U.S. Cl. ..................................... 403/53; 403/228; 416/134 A
[58] Field of Search ................. 403/53, 225, 226, 227, 403/228, 220; 416/205, 215, 216, 134, 140, 132, 221

[56] References Cited

U.S. PATENT DOCUMENTS

| | | | |
|---|---|---|---|
| 2,241,055 | 5/1941 | Chilton | 416/134 |
| 2,631,680 | 3/1953 | LeCompte et al. | 170/100.53 |
| 3,484,172 | 12/1969 | Reed | 416/18 |
| 3,504,902 | 4/1970 | Irwin | 403/225 X |
| 3,734,546 | 5/1973 | Herbert et al. | 285/49 |
| 3,782,854 | 1/1974 | Rybicki | 416/134 A |
| 3,853,337 | 12/1974 | Herbert et al. | 285/49 |
| 3,862,812 | 1/1975 | Gorndt et al. | 416/141 |

*Primary Examiner*—Wayne L. Shedd
*Attorney, Agent, or Firm*—Maurice R. Salada; James W. Wright

[57] ABSTRACT

A rotary blade retention system comprises a rotor hub rotatable about a central axis and a retention assembly coupling at least one blade to the rotor hub. The blade extends generally radially from the hub and rotates with the hub about its central axis. The retention assembly includes a frictionless thrust bearing and an elastomeric thrust bearing connected together in series. The two bearings are mounted relative to the blade and the rotor hub such that when a centrifugal load is imposed on the blade, the bearings are loaded in compression and cooperate to restrain the blade against the centrifugal load. The frictionless bearing permits free pivotal movement of the blade about its longitudinal axis so as to effect variations in the pitch of the blade. The elastomeric thrust bearing includes at least one laminated bearing having a plurality of layers of rigid and elastomeric material which alternate lengthwise of the blade. The layers are also inclined relative to the longitudinal axis of the blade to define an effective elastic center for the bearing located along the blade radially outward of the two bearings relative to the rotor hub.

9 Claims, 3 Drawing Figures

ROTARY BLADE RETENTION SYSTEM

This is a continuation of application Ser. No. 597,105, filed July 18, 1975 now abandoned.

BACKGROUND OF THE INVENTION

In propeller assemblies for aircraft power plants, aerodynamic and engine induced forces place high bending moments on the propeller blades. While the blades are ordinarily are ordinarily more or less rigid structurally, they deflect under operating loads and are thus subjected to large operational stresses, which are generally vibratory in character. Various proposals have been made to minimize or eliminate bending moments in propeller blades. The proposals have included: (a) an articulating connection between each propeller blade and the propeller hub; (b) an elastic mounting of the entire propeller on its drive shaft; and (c) an elastic connection between each propeller blade and the propeller hub.

The last mentioned proposal has recently gained considerable favor, particularly in the helicopter industry. While older proposals for such an elastic or resilient connection merely utilize a body of elastomer, as shown, for example, in Le Compte et al. U.S. Pat. No. 2,631,680, more recent designs have utilized high-capacity, laminated elastomeric bearings. Such bearings consist of alternating layers of an elastomer, such as rubber, and a rigid material, such as metal, bonded together to produce a bearing that can carry extremely high compression loads normal to the layers, yet can accommodate a high degree of pivotal movement along the layers through shearing of the elastomer layers. Examples of mounting arrangements for helicopter blades which utilize laminated elastomeric bearings can be seen in: FIG. 5 of Reed U.S. Pat. No. 3,484,172; Gorndt et al. U.S. Pat. No. 3,106,965; Schmidt U.S. Pat. No. 3,292,712; Gorndt U.S. Pat. No. 3,700,352; Rybicki et al. U.S. Pat. No. 3,764,230; and Gorndt et al. U.S. Pat. No. 3,862,812. (The Gorndt and Schmidt patents are all assigned to the assignee of the present invention.) As utilized in helicopter rotors, laminated elastomeric bearings accommodate the various blade motions that are encountered during flight, such as lead-lag movement, flapping, and blade pitch variations. To permit the necessary pivotal movements of the blades, the bearings must be relatively large.

In fixed wing aircraft, it is customary to mount the propeller blades rigidly on the propeller hub or hubs, except for the use of frictionless bearings to permit changes in blade pitch. To keep vibratory operational stresses within acceptable limits, the blades are configured so as to detune them from the exciting frequencies. Since the exciting frequencies vary with different aircraft engines, propeller blades must often be redesigned for use with different engines. Such redesigning has been accepted in the industry at least partly because the Federal Aviation Administration certifies aircraft engines and propellers together as complete assemblies, rather than as separate items. While elastomeric bearings offer the opportunity to eliminate or at least reduce blade redesigns, the propeller hubs of fixed-wing aircraft, particularly light planes having variable pitch propellers, are not large enough, nor can they be conveniently enlarged, to accommodate large laminated elastomeric bearings. Accordingly, a laminated elastomeric bearing cannot be used in such an installation to perform both a stress-relief function and a variable pitch accommodation function. If elastomeric bearings are to be used at all in the propellers of fixed-wing aircraft, the bearings must be kept small in size by using them in combination with roller or ball bearings, in the manner illustrated in the Le Compte and Reed patents noted above. The ball bearings or roller bearings will accommodate the large rotational movements associated with changes in pitch, while the elastomeric bearings will accommodate the smaller movements resulting from blade vibration.

SUMMARY OF THE INVENTION

The present invention is directed to a blade retention system which utilizes a frictionless or antifriction thrust bearing, such as a roller bearing or ball bearing, connected in series with an elastomeric thrust bearing and which is particularly suitable for use in the propellers of fixed-wing aircraft. The blade retention system of the invention differs from similar retention systems, such as the systems shown in the Reed and Le Compte patents, by utilizing a laminated elastomeric bearing that defines an effective elastic center located outward of the bearing along the longitudinal axis of a propeller blade that is being mounted.

According to the invention, a blade retention system comprises a rotor hub rotatable about a central axis and a retention assembly connecting at least one blade to the rotor hub for rotation with the hub about its central axis. As connected, the blade normally extends generally radially from the hub. The retention assembly includes a frictionless thrust bearing and an elastomeric thrust bearing connected together in series. The two bearings are mounted relative to the blade and the rotor hub such that when a centrifugal load is imposed on the blade, the bearings are loaded in compression and cooperate to restrain the blade against the centrifugal load. The frictionless bearing freely permits pivotal movement of the blade about its longitudinal axis so as to allow changes in the pitch of the blade. The elastomeric bearing includes at least one laminated bearing member having a plurality of layers of rigid and elastomeric material which alternate along the length of the propeller blade. The layers are also inclined relative to the longitudinal axis of the blade to define an effective elastic center for the bearing which is located along the blade radially outward of both the frictionless bearing and the elastomeric bearing relative to the rotor hub.

The use of a "focalized" elastomeric bearing that defines an effective mounting point or elastic center spaced from the geometric center of the bearing causes a shift in the position of the nodal point or points occurring in the various modes of blade vibration, as compared with a rigid blade mounting or an unfocalized elastomeric bearing. In a propeller blade that is rigidly mounted at one end on its associated hub, the operational loads on the blade will cause it to vibrate in a manner similar to a cantilevered beam, with one or more nodal points located along the length of the blade as determined by the blade structure, the frequency of vibration, and other factors. Since the blade is rigidly mounted at its inboard end, a first nodal point will always occur at the inboard end. As is indicated in the Federal Aviation Administration's Advisory Circular No. 20-66, dated Jan. 29, 1970, for example, the inboard end of a propeller blade is subjected to a variety of loads, including steady loads due to centrifugal, bending, and twisting forces, as well as loads due to vibratory bending and twisting. Thus, if the high stresses associated with a vibratory nodal point also occur at or near the blade end, blade life can be reduced and the likelihood of failure of the blade and/or portions of the hub assembly is increased. Utilizing an elastomeric bearing to mount the blade causes a shift in the position of the first nodal point and its associated stresses outward along the blade away from the critical blade shank area. A focalized elastomeric bearing increases the outward shift of the first (and subsequent) nodal points for any given mode of vibration. In addition, the use of focalized bearings offers the opportunity to shift nodal points with some predictability by moving the focal points of the bearings (e.g., by replacing a given bearing with another having a different focal point). While focalized elastomeric bearings have been utilized in helicopter rotors, as shown, for example, in Gorndt et al. U.S. Pat. No. 3,862,812, such focalized bearings have not been used to move the effective mounting point of a rotor blade outboard of the bearings of the blade retention system. Instead, such bearings have been focalized to insure that motions to be accommodated by the bearings are along the elastomer layers in the bearings and to provide needed stability and resistance to blade shear loads.

In a preferred embodiment of the present invention, both the frictionless bearings and the elastomeric bearing are annular and are disposed within a bearing housing carried by the rotor hub. The bearing housing has a central opening facing radially outwardly from the rotor hub and, within the housing, an annular mounting surface circumscribes the opening and faces radially inwardly toward the rotor hub. The central openings in the two bearings are aligned with the opening in the bearing housing to receive the inboard end of the blade through all three aligned openings. A second annular mounting surface concentric with the longitudinal blade axis is carried by the blade and faces radially outwardly relative to the rotor hub. The frictionless and elastomeric bearings are mounted between the mounting surface on the bearing housing and the mounting surface carried by the blade.

To achieve the desired focalization, each of the layers of the elastomeric bearing is annular and has a pair of frustoconical side surfaces. The layers are oriented so that the ends of the frustoconical side surfaces having the smallest circumferences are all the radially innermost, relative to the rotor hub, portions of the layers. The frictionless bearing is a ball bearing and is disposed outboard of the elastomeric bearing. The retention system also includes a mechanism operative between the rotor hub and the blade for preloading the elastomeric bearing along the longitudinal axis of the blade. The openings in the bearing housing and the bearings are enlarged relative to the inboard end of the blade to permit limited movement of the blade relative to the housing and the bearings about an axis normal to the longitudinal axis of the blade.

BRIEF DESCRIPTION OF THE DRAWING

For a better understanding of the invention, reference may be made to the following description of an exemplary embodiment, taken in conjunction with the figures of the accompanying drawing, in which.

DESCRIPTION OF AN EMBODIMENT

Figure 1:
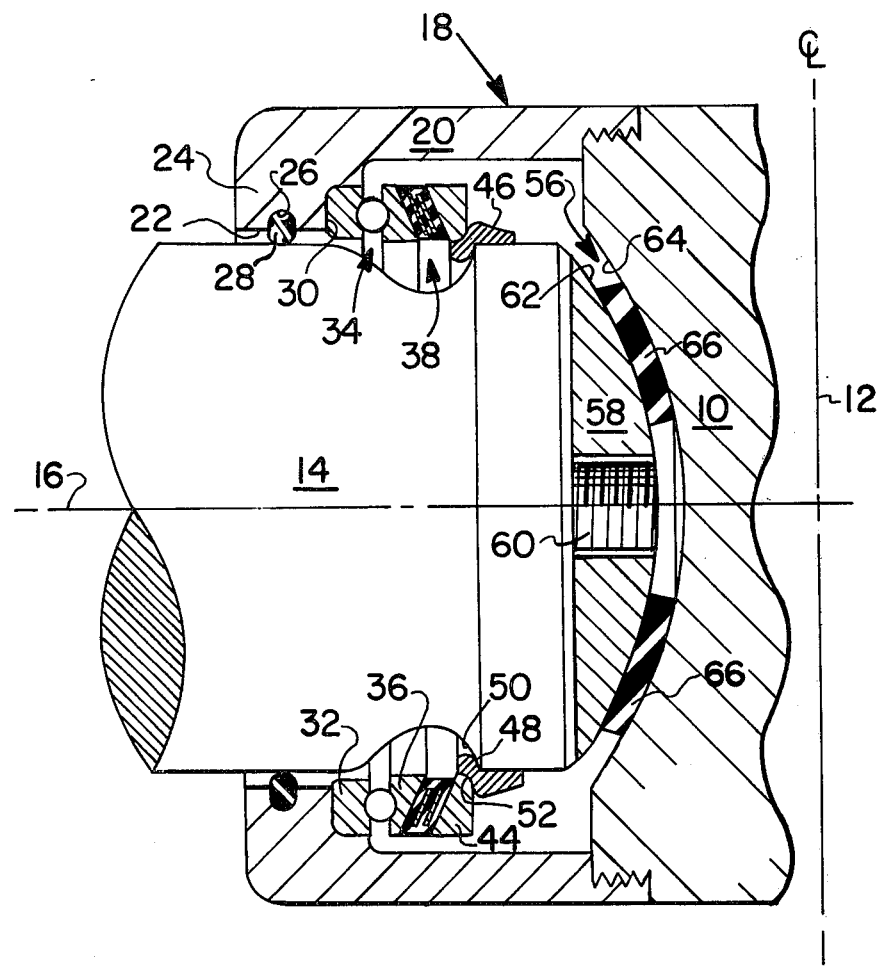
FIG. 1 is a side sectional view of a blade retention system according to the present invention.

FIG. 1 of the drawing illustrates a blade retention system, according to the present invention, which includes a rotor hub 10 rotatably driven by a conventional drive assembly (not shown) about a central axis 12. A propeller blade 14 is coupled to the rotor hub 10 for rotation with the hub about its central axis 12. The blade 14 is normally disposed with its longitudinal axis 16 extending generally radially from the hub 10.

The blade 14 is coupled to the hub 10 by a retention assembly, generally designated 18. The retention assembly 18 includes an annular housing 20 secured at one end, by screw threads, for example, to the rotor hub 10 and extending radially outwardly from the hub. An annular flange 24 extends radially inwardly of the outboard end of the housing 20 to define a central opening 22 for the housing. The butt or inboard end of the blade 14 extends through the opening 22 and is somewhat smaller in diameter than the diameter of the opening so as to permit limited movement of the blade relative to the housing, as will be described hereinafter. The radially inner surface of the flange 24 has a circumferential groove 26 that mounts an annular, elastomeric sealing ring 28 which provides a seal between the surface of the blade 14 and the housing flange 24. The flange 24 also defines, within the housing 20, an annular mounting surface 30 adjacent to and circumscribing the central opening 22.

The mounting surface 30 faces inwardly toward the rotor hub 10 and receives one race 32 of an annular ball bearing, generally designated 34. The bearing 34, like the housing 20, encircles the inboard end of the propeller blade 14 and the second race 36 of the bearing is integrally bonded to an annular, laminated elastomeric bearing, generally designated 38. The laminated elastomeric bearing 38 is comprised of a plurality of annular layers of rigid and elastomeric material which alternate along the length of the blade 14. Each layer has a pair of parallel, frustoconical side surfaces that are bonded to similar surfaces of adjacent layers. The elastomeric layers are preferably formed of natural rubber, while the rigid layers are preferably formed of steel. Other elastomeric and rigid materials may be substituted for the rubber and steel where appropriate. Alternate elastomeric materials may include synthetic rubber, while alternate rigid materials may include other metals, sheets of fiberglass, and reinforced plastic.

The elastomeric layer that is farthest from the race 36 of the ball bearing 34 is bonded to a surface of an annular, steel end plate 44. The surface of the end plate 44 opposite the elastomeric layers engages a split retaining ring 46 carried by the blade 14. The retaining ring 46 is configured to define a shoulder portion 48 that is located radially inwardly of the ring 46 relative to the longitudinal axis of the blade 14 and is supported on a surface of an annular groove 50 formed in the outer circumferential surface of the inboard end of the blade. A corresponding shoulder 52 formed on the radially outer surface of the retaining ring 46 defines an annular mounting surface that faces outwardly of the rotor hub 10 and engages the end plate 44.

In operation, when the rotor hub 10 is being rotated by the drive assembly (not shown), a centrifugal load is exerted on the propeller blade 14 along its longitudinal axis 18 tending to force the blade 14 radially away from the hub. The centrifugal load is transferred from the blade 14 through the retaining ring 46 to the two bearings 34 and 38, which are effectively coupled in series. The load is thus transmitted through the various elastomeric and rigid layers of the elastomeric bearing 38 and through the frictionless ball bearing 34 into the flange 24 of the housing 20. The housing 20 is held in position by its connection to the rotor hub 10. Since the diameter of the inboard end of the propeller blade 14 is less than the diameters of the openings in the housing 20 and the bearings 34 and 38, the blade has some freedom to move in response to aerodynamic forces exerted in directions other than lengthwise of the blade. Such forces, while include loads exerted radially of the longitudinal axis 16 of the propeller blade 14, are accommodated to some extent through shearing of the elastomeric layers of the bearing 38. since the layers of the bearing 38 are frustoconical rather than spherical, however, the elastomeric layers are never loaded in shear alone but always partly in compression, which limits movement of the blade 14 to some extent in response to radial loads. Throughout such movements in response to radial loads, for example, the two bearings 34 and 38 continue to resist the centrifugal loading on the blade 14 and the ball bearing 34 permits rotational movement of the blade about its longitudinal axis 16 to change the pitch of the blade. Rotation of the blade 14 to change its pitch is accomplished by a conventional mechanism not shown in the drawing for clarity.

Figure 3:
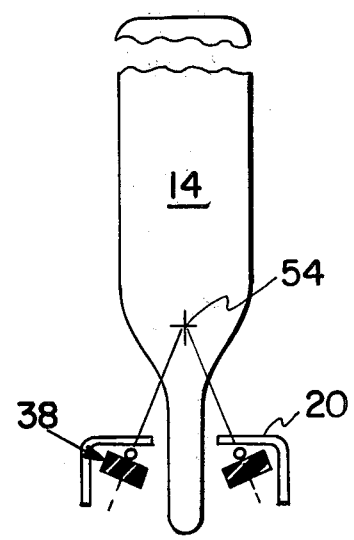
FIG. 3 is a schematic representation of the focalization of the elastomeric bearing incorporated in the blade retention system.

FIG. 3 of the drawing illustrates that the frustoconical shapes of the layers of the elastomeric bearing 38 produce a focal point 54 and an effective elastic center for the bearing located outboard of the elastomeric bearing, the ball bearing 34 and the housing 20. The effective elastic center of the bearing 38 is located adjacent to, although somewhat inboard of, the focal point. (The reasons for the disparity in location between the focal point and the elastic center are known in the art and need not be discussed for an understanding of the present invention.) Accordingly, the effective mounting point of the blade 14 on the hub 10 is slightly inboard of the focal point of the bearing. As indicated above, an outboard location of the effective mounting point moves the inboard nodal points resulting from vibratory motion of the blade 14 into less critical positions outboard of the blade and causes the associated stresses to be moved away from the inboard end of the blade and the housing 20 so as to reduce the likelihood of failure of either the blade or the housing.

Figure 2:
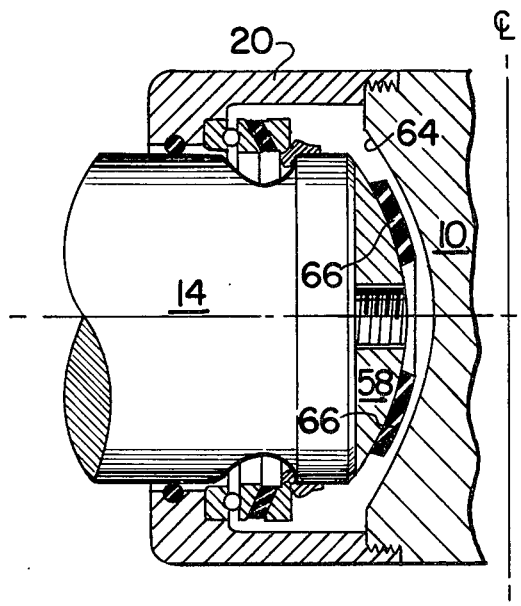
FIG. 2 is a second side sectional view of the retention system of FIG. 1 reduced in size and showing movement of the blade under centrifugal loading.

In order to insure a relatively tight fit of the blade 14 in the rotor hub 10 when no centrifugal load is being exerted on the blade, a preload or precompression assembly 56 is provided between the rotor hub and the inboard end of the propeller blade. The preload assembly 56 comprises a cap or nut 58 screwed onto a short threaded shaft 60 projecting from the base of the propeller blade 14. The cap or nut 58 has one side that is essentially flat to mate with the end of the propeller blade 14 and a second side that has a spherical surface 62. A similar spherical surface 64 is formed on a portion of the rotor hub 10 and faces radially outwardly of the hub toward the surface 62. An annular elastomeric pad 66 is disposed between the two spherical surfaces 62 and 64 and is bonded to the surface 62. The pad 66 may be formed entirely of elastomer, such as rubber, or may include one or more shims or plates like the bearing 38. Together, the rotor hub 10, the elastomeric pad 66 and the cap 58 precompress the elastomeric bearing 38 during static conditions of the rotor 10. The frictional engagement between the pad 66 and the surface 64 of the rotor 10 also resists drooping of the blade 14 during such static conditions of the rotor hub. As shown in FIG. 2, during centrifugal loading of the blade 14, the cap 58 and the pad 66 are pulled away from the surface 64 of the hub 10 so that the pad 66 does not produce any frictional resistance to relative movement of the propeller 14 in the retaining assembly 18.

It will be understood that the embodiment described above is merely exemplary and that persons skilled in the art may make many variations and modifications without departing from the spirit and scope of the invention. For example, the layers of the laminated elastomeric bearing 38 may have spherical, rather than frustoconical side surfaces. All such modifications and variations are intended to be within the scope of the invention as defined in the appended claims.

What is claimed is:

1. A rotary blade retention system for mounting at least one blade having a longitudinal axis, said system comprising:
   (a) a rotor hub rotatable about a central axis; and
   (b) retention means coupling the blade to the rotor hub for rotation with the hub about its central axis, the blade normally extending generally radially from the hub, said retention means including:
   (i) means carried by the rotor hub defining a first mounting surface which is oriented transversely to the longitudinal axis of the blade,
   (ii) means carried by the blade defining a second mounting surface which is oriented transversely to the longitudinal axis of the blade and which is spaced from the first mounting surface,
   (iii) an antifriction thrust bearing, and
   (iv) at least one laminated elastomeric bearing having a plurality of layers of rigid and elastomeric material which alternate lengthwise of the blade and which are inclined relative to the longitudinal axis of the blade,
   the antifriction bearing and the laminated elastomeric bearing being coupled together in series and mounted between the first and second mounting surfaces such that when a centrifugal load is imposed on the blade the antifriction bearing and the elastomeric bearing are loaded in compression and cooperate to restrain the blade against the centrifugal load, the antifriction bearing freely permitting pivotal movement of the blade about its longitudinal axis and the layers of the laminated elastomeric bearing being inclined to define an effective elastic center located along the blade radially outward of both the antifriction bearing and the elastomeric bearing relative to the rotor hub, the laminated elastomeric bearing being mounted between the antifriction bearing and one of said first and second mounting surfaces such that pivotal movements of the blade which occur during rotation of the rotor hub and relative to the hub about axes transverse to the longitudinal axis of the blade cause deflection of the elastomeric layers of the laminated elastomeric bearing.

2. A blade retention system, according to claim 1, wherein each of the layers of the laminated bearing is annular and has a pair of frustroconical side surfaces, the frustroconical side surfaces of adjacent layers being juxtaposed with and bonded to each other so that a larger diameter end of each side surface of a layer is disposed adjacent to the larger diameter end of a side surface of another layer.

3. A blade retention system, according to claim 1, also comprising means operative between the rotor hub and the blade for preloading the antifriction bearing and the laminated bearing along the longitudinal axis of the blade.

4. A blade retention system, according to claim 1, wherein the antifriction bearing comprises a ball bearing.

5. A blade retention system, according to claim 1, wherein the laminated bearing is disposed inboard of the antifriction bearing.

6. A blade retention system, according to claim 1, wherein one end of the laminated bearing is mounted to move with the blade when it pivots relative to the hub about axes transverse to the longitudinal axis of the blade, and wherein the other end of the laminated bearing is mounted to remain with the hub when the blade pivots relative to the hub about axes transverse to the longitudinal axis of the blade.

7. A rotary blade retention system for mounting at least one blade having a longitudinal axis, said system comprising:
(a) a rotor hub rotatable about a central axis, and
(b) retention means coupling the blade to the rotor hub for rotation with the hub about its central axis, the blade normally extending generally radially from the hub, said retention means including:
(i) a bearing housing carried by the rotor hub and having an opening facing radially outwardly from the rotor hub, said housing internally defining a first mounting surface adjacent to and circumscribing said opening and facing radially inwardly toward the rotor hub,
(ii) an annular, antifriction thrust bearing disposed within the bearing housing so that a central opening in the bearing is aligned with the opening in the housing, and
(iii) an annular, laminated, elastomeric thrust bearing comprising a plurality of layers of rigid and elastomeric material which alternate lengthwise of the blade, each of said layers being annular and having a pair of frustroconical side surfaces, the frustroconical side surfaces of adjacent layers being juxtaposed with and bonded to each other so that a larger diameter end of each side surface of a layer is disposed adjacent to the larger diameter end of a side surface of another layer, said elastomeric bearing being disposed within the bearing housing and coupled in series with the antifriction bearing so that a central opening in the elastomeric bearing is aligned with the openings of the antifriction bearing and the housing,
the inboard end of the blade extending through the openings in the housing and series-connected antifriction and elastomeric bearings and having means defining a second annular mounting surface concentric with and oriented transversely of the longitudinal blade axis and facing radially outwardly relative to the rotor hub,
the series-connected bearings being mounted between the first and second mounting surfaces so that the layers of the elastomeric bearing define an effective elastic center for the elastomeric bearing located radially outward of the bearing housing along the longitudinal blade axis.

8. A blade retention system, according to claim 7, wherein the openings in the bearing housing and the bearings are enlarged relative to the inboard end of the blade to permit limited movement of the blade relative to the housing and the bearings about an axis normal to the longitudinal blade axis.

9. A rotary blade retention system for mounting at least one blade having a longitudinal axis, said system comprising:
(a) a rotor hub rotatable about a central axis, and
(b) retention means coupling the blade to the rotor hub for rotation with the hub about its central axis, the blade normally extending generally radially from the hub, said retention means including:
(i) a bearing housing carried by the rotor hub and having an opening facing radially outwardly from the rotor hub, said housing internally defining a first mounting surface adjacent to and circumscribing said opening and facing generally inwardly toward the rotor hub,
(ii) an annular, antifriction thrust bearing disposed within the bearing housing so that a central opening in the bearing is aligned with the opening in the housing, and
(iii) an annular, laminated, elastomeric thrust bearing comprising a plurality of layers of rigid and elastomeric material which alternate lengthwise of the blade, each of said layers being annular and inclined relative to the longitudinal axis of the blade, said elastomeric bearing being disposed within the bearing housing and coupled in series with the antifriction bearing so that a central opening in the elastomeric bearing is aligned with the openings of the antifriction bearing and the housing,
the inboard end of the blade extending through the openings in the housing and the series-connected antifriction and elastomeric bearings and having means defining a second mounting surface oriented transversely of the longitudinal blade axis and facing generally outwardly relative to the rotor hub,
the series-connected bearings being mounted between the first and second mounting surfaces such that the layers of the elastomeric bearing define an effective elastic center for the elastomeric bearing located radially outward of the bearing housing along the longitudinal blade axis and such that pivotal movements of the blade which occur during rotation of the rotor hub and relative to the hub about axes transverse to the longitudinal axis of the blade cause deflection of the elastomeric layers of the elastomeric bearing.

* * * * *